United States Patent [19]
Doerer

[11] 4,188,440
[45] Feb. 12, 1980

[54] SELF-SUPPORTING AUTOMOTIVE LINER PANEL

[75] Inventor: Richard P. Doerer, Grosse Pointe, Mich.

[73] Assignee: Van Dresser Corporation, Troy, Mich.

[21] Appl. No.: 5,956

[22] Filed: Jan. 24, 1979

Related U.S. Application Data

[63] Continuation-in-part of Ser. No. 886,137, Mar. 13, 1978, which is a continuation-in-part of Ser. No. 592,611, Jul. 2, 1975, abandoned.

[51] Int. Cl.² .............................. B32B 3/26; B32B 5/14; B32B 5/20
[52] U.S. Cl. .............................. 428/215; 296/137 A; 428/315
[58] Field of Search ............... 428/213, 214, 215, 315, 428/310, 313, 322; 296/137 A

[56]  References Cited
U.S. PATENT DOCUMENTS

| | | | |
|---|---|---|---|
| 3,256,133 | 6/1966 | Wright et al. | 428/315 |
| 3,302,362 | 2/1967 | Lang | 428/322 |
| 3,389,195 | 6/1968 | Giankos et al. | 428/322 |
| 3,446,685 | 5/1969 | Goldstone et al. | 428/314 |
| 3,506,532 | 4/1970 | Bock et al. | 428/31 |
| 3,541,620 | 11/1970 | Chapius | 428/310 |
| 3,565,746 | 2/1971 | Stevens | 428/322 |
| 3,582,095 | 6/1971 | Bogaert | 428/320 |
| 3,607,584 | 9/1971 | Becht | 428/322 |
| 3,627,622 | 12/1971 | Vega | 428/322 |
| 3,640,938 | 2/1972 | Finelli | 428/315 |
| 3,647,608 | 3/1972 | Enlow et al. | 428/313 |
| 3,698,927 | 10/1972 | Sawyer | 428/315 |
| 3,755,063 | 8/1973 | Massey et al. | 428/322 |
| 3,954,537 | 5/1976 | Alfter et al. | 428/315 |
| 4,020,207 | 4/1977 | Alfter et al. | 428/315 |

Primary Examiner—William J. Van Balen
Attorney, Agent, or Firm—Whittemore, Hulbert & Belknap

[57]  ABSTRACT

A contoured self-supporting automotive liner panel, such as a headliner, which comprises an outer substrate layer, an intermediate layer and an outer flexible, decorative, finish cover layer. The substrate layer is formed of expanded plastics material which is relatively rigid and has a substantial resistance to bending. The intermediate layer is formed of a relatively soft, compressible, flexible, expanded plastics material.

9 Claims, 3 Drawing Figures

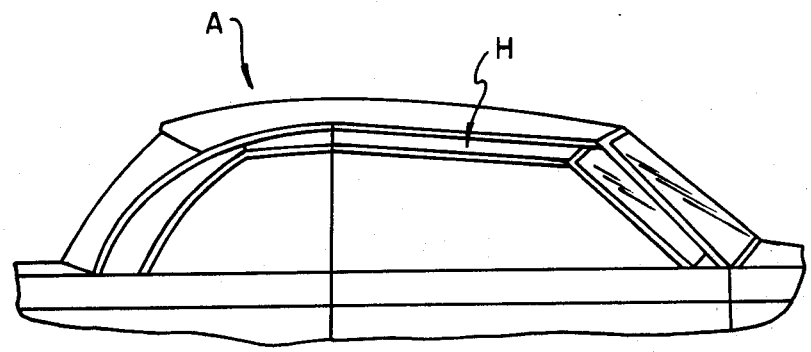
FIG. 1
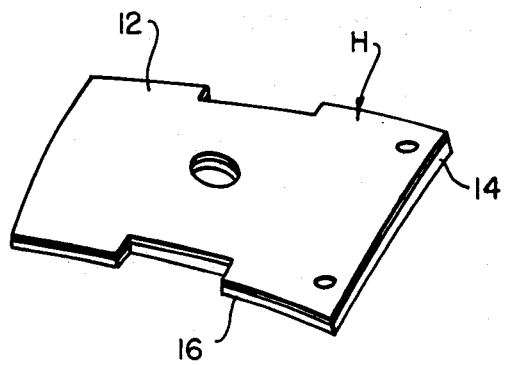
FIG. 2
FIG. 3
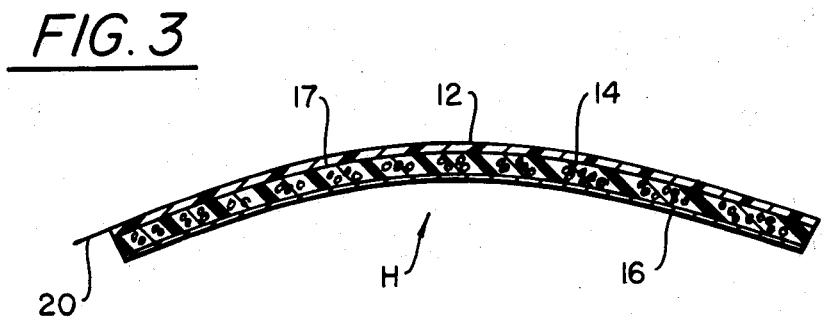

SELF-SUPPORTING AUTOMOTIVE LINER PANEL

REFERENCE TO RELATED APPLICATION

This application is a continuation-in-part of my co-pending application Ser. No. 886,137 filed Mar. 13, 1978 which is a continuation-in-part of my application Ser. No. 592,611, filed July 2, 1975, now abandoned.

This invention relates generally to panels and refers more particularly to self-supporting automotive headliner panels.

SUMMARY OF THE INVENTION

The panel of this invention includes a substrate layer formed to the required contour for installation. The substrate layer is formed of a heat-resistant expanded plastics material which is relatively light in weight, is easily molded or thermoformed, and is rigid or stiff enough to hold its shape. Suitable foamed plastics materials are polystyrene, urethane, polypropylene and a copolymer of styrene and maleic anhydride.

The panel also includes an intermediate layer of relatively soft compressible, flexible, expanded plastics material. Such material has a soft feel, is heat and sound insulating, will conceal imperfections in the substrate layer, and is relatively light in weight. A suitable material is flexible, compressible, polyester urethane foam. Another suitable material is latex.

The panel also includes a flexible decorative finish cover layer extending over the intermediate layer. A knitted cloth or a vinyl skin may be used. The cover layer provides a decorative, attractive finish but without detracting from the softness to the touch imparted by the intermediate layer.

BRIEF DESCRIPTION OF THE DRAWINGS

FIG. 1 is a fragmentary elevational view of an automobile provided with a headliner panel constructed in accordance with this invention.

FIG. 2 is a perspective view of the headliner shown in FIG. 1.

FIG. 3 is a cross sectional view of the headliner shown installed in the roof of an automobile.

DETAILED DESCRIPTION

Referring now more particularly to the drawing, the automotive panel is shown as being in the form of a headliner and is generally designated H. It is installed in the roof of the automobile A by any suitable means, not shown. Accessories such as the housing for the shoulder harness, the dome light and sun visor brackets may be at least a part of the means for securing the headliner in place. The headliner is shown with cut-out portions for these accessories.

The headliner H is made up of a substrate 12 of relatively stiff expanded plastics material, an intermediate layer 14 of relatively soft sound absorbing expanded plastics material, and a flexible decorative finish cover layer 16.

One very suitable material from which the substrate 12 may be made is expanded polystyrene. A panel or sheet of that material is heat resistant and has a substantial resistance to bending. It may be formed either by molding or by thermoforming an extruded sheet. It is kept thin in order to reduce its weight although it has sufficient thickness to hold its shape. A thickness range of 0.040" to 0.250" is suitable for a substrate of expanded polystyrene, although 0.150" to 0.180" is preferred.

The expanded polystyrene substrate 12 may have a density of 2-8 pounds per cubic foot, four pounds per cubic foot being preferred, and be made by molding in a closed mold in accordance with conventional practice, using expandable beads or pellets and a suitable blowing agent. A measured quantity of the beads are charged into a mold cavity having the contour required to be imparted to the substrate sheet for installation in the automobile. Upon heating with low pressure steam, say 8–40 p.s.i., the blowing agent vaporizes to form distinctive cells within the softened polystyrene and with continued heating, adjacent cells weld together to form a common wall. Expansion of the mass will continue until an interconnected cell structure conforms to the shape of the mold. Subsequent cooling will fix the shape of the molded panel or sheet which can then be ejected from the mold. Molding of the substrate requires a rather expensive die but the end product comes out in the exact form, size and shape required.

The substrate may if desired be extruded in a flat sheet of the desired substrate thickness and then thermoformed to the correct contour on a heated pattern or die. During the extrusion process, the blowing agent may be introduced into the barrel of an extruder and the expandable resin extruded while expanding through an annular die, pulled over a sizing mandrel and slit to sheet form. The extruded sheet is then laid over the pattern or die and heat is applied to it in any suitable manner as by the use of overhead heaters. A pattern or die is considerably less expensive than a mold. The sheet after being thermoformed on the pattern or die becomes sufficiently rigid to hold its shape.

The substrate may also be extruded in sheet form and then compression molded in matched metal dies.

The procedures both for molding and for extruding followed by thermoforming to produce a self-supporting substrate of expanded polystyrene are well known and summarized in "Modern Plastics Encyclopedia," Volume 50, No. 10A, 1973–74, particularly on Pages 164–166, 362–372, and Volume 51, No. 10A, 1974–75, particularly on Pages 134–135, 366–371, which are incorporated herein by reference.

While expanded polystyrene has been found to be an excellent material from which to form the substrate layer 12, an expanded styrene copolymer formed by the copolymerization of styrene and maleic anhydride which is equally as stiff and resistant to bending, is preferred primarily because it has a higher heat resistance than polystyrene. One such copolymer containing 6%–20% by weight of maleic anhydride, available under the trademark Dylark, is particulary recommended and has a heat resistance as much as 35° F. higher than polystyrene. The heat resistance of the expanded styrene copolymer known as Dylark, in testing based on deflection under load, indicated a heat resistance without appreciable deflection under load up to a temperature of almost 240° F., whereas polystyrene in a similar test deflected under load at slightly over 200° F.

Substrates of an expanded styrene copolymer formed by the copolymerization of styrene and maleic anhydride can be molded or extruded and thermoformed by the same procedures described above for expanded polystyrene. A typical melt temperature molding range for the styrene copolymer is 400° F. to 525° F. A mold temperature range of 120° F. to 170° F. is recommended. A typical melt temperature range for extrusion is 380° F. to 425° F.

Dylark is available from Arco Polymers, Inc., a subsidiary of Atlantic Richfield Company, Philadelphia, Pa.

Other suitable materials which may be used to form the substrate 12 are expanded urethane and expanded polypropylene. Both of these materials provide adequate stiffness and lightness of weight. The thickness and density ranges specified for expanded polystyrene also apply to substrate layers of expanded urethane, expanded polypropylene or an expanded styrene copolymer formed by the copolymerization of styrene and maleic anhydride including the copolymer known as Dylark.

The substrate layer 12 may be perforated to provide a multiplicity of holes over its entire surface to improve the acoustical insulation of the panel. A hole size of 0.060" to 0.190" is recommended, preferably 0.170".

The intermediate relatively soft compressible layer 14 of sound absorbing material is made of flexible compressible urethane foam, preferably a polyester urethane foam. A polyester urethane foam is preferred because it responds well to flame treatment for rendering its surface tacky enough to bond to the decorative cover layer or the substrate layer, as described more fully hereinafter. It is formed to approximately the same length and width dimensions as the substrate 12, or sometimes to slightly lesser dimensions to facilitate installation of the headliner, and is sufficiently flexible to follow the contour of the substrate when adhered thereto as by a layer 17 of an adhesive. A suitable adhesive is a water soluble or water dispersed synthetic resinous adhesive, such for example as resin-latex. The intermediate layer 14 is not only sound absorbing as well as heat absorbing but protects the substrate from denting and conceals any dents in it that may exist. The soft urethane layer 14 also gives a rich texture or feel to the headliner. Its thickness will be determined primarily by the qualities of heat and sound insulation and softness of feel desired, and generally will be in the range of 0.040" to 0.750", but preferably 0.060" to 0.500". The density of the intermediate layer may be 1 to 8 pounds per cubic foot, and preferably 1 to 4 pounds per cubic foot.

The flexible foam layer 14 of urethane may be made by conventional molding techniques in a mold having the desired dimensions of the finished product. The molded part may be vacuum formed over the substrate 12 and secured thereto by an adhesive such as described above. The flexible urethane foam layer 14 may also be formed by spraying it directly on the back of the substrate 12 in which case no adhesive is required.

The intermediate layer 14 has for its primary purposes to provide sound insulation and a soft feel and due to its softness it hides dents that may occur in the substrate 12. While flexible urethane is preferred because it rates high in these qualities, and also is a good heat insulator and is light in weight, the layer 14 may if desired be made of other materials having similar properties, such for example as latex. The layer 14 formed of latex would have the same thickness and density ranges as specified for urethane foam and adhered to the layer 12 in the same manner as if formed of urethane.

The procedures for molding the flexible urethane foam layer 14 are well known and summarized in the volumes of "Modern Plastics Encyclopedia," previously referred to, particularly Pages 134–137, of Volume 50, No. 10A of 1973–74, and Pages 136–138 of Volume 51, No. 10A, 1974–75, which are incorporated herein by reference.

Instead of utilizing a layer of adhesive to bond the layers 12 and 14 together, they may be bonded to one another in surface-to-surface contact without any intervening layer or film of adhesive, as for example by flame laminating in which one of the contacting surfaces, such as the surface of the intermediate layer 14, is softened and rendered tacky by the application of heat from a torch so that upon application to the substrate layer, the contacting surfaces will weld or fuse together. Securing layers 12 and 14 together in this manner is preferred because it eliminates the need for an adhesive, provides a superior bond and does not stiffen the intermediate layer 14 as an adhesive tends to do.

The finish layer 16 is a flexible decorative cover layer and may consist of a thin vinyl skin or a piece of cloth. It will have the same length and width dimensions as the intermediate layer 14 and will be secured to the side of the intermediate layer 14 opposite the substrate 12. Preferably, the two layers 14 and 16 will be fused together in an intimate surface-to-surface contacting relation without any intervening adhesive material. For this purpose, flame laminating by heating the surface of the intermediate layer sufficiently to render it tacky and to fuse to the cover layer upon contact, may be employed. Alternatively, an adhesive such as described above may be used to adhere the cover layer to the intermediate layer. However, an adhesive between these layers may detract from the soft feel of the head-liner by preventing the softness of the intermediate urethane layer from transmitting through to the cover layer.

A finish vinyl cover layer should preferably be extremely thin, within a suggested thickness range of 0.005" to 0.010" so as to be very flexible and to readily transmit the softness of the intermediate urethane layer. It may be perforated, that is formed with a multiplicity of small holes, or unperforated.

A cloth formed of knitted material serves as an excellent finish cover layer. Preferably a cloth of a tricot type construction which has been knitted, then dyed, and then napped for finished appearance is preferred.

The headliner H is shown in FIG. 3 installed in an automobile with the substrate 12 held up against the auto roof 20 by any suitable means. The substrate has been formed to the desired contour for installation and as before noted has a substantial resistance to bending so as to hold the shape of the headliner. The intermediate layer 14 is sound insulating, provides a rich texture or feel and covers and conceals any dents or imperfections in the substrate. It also insulates against heat. The layer 16 on the exposed side provides a decorative finish.

I claim:

1. A laminated self-supporting, automotive liner panel of predetermined contour consisting of an outer substrate layer of a heat resistant, expanded styrene copolymer formed by the copolymerization of styrene and maleic anhydride which is relatively rigid and has a substantial resistance to bending, an intermediate layer of relatively soft, compressible, flexible urethane foam bonded to one side of said substrate layer in direct surface-to-surface contact therewith, said intermediate layer being of sufficient thickness to provide heat and sound insulation, to provide a soft feel and to conceal imperfections in said substrate layer, and an outer flexible decorative finish cover layer bonded to the side of said intermediate layer opposite said substrate layer in direct surface-to-surface contact therewith.

2. The automotive liner panel defined in claim 1, wherein said copolymer contains about 6%–20% by weight of maleic anhydride.

3. The automotive liner panel defined in claim 2, wherein said substrate layer has a thickness of 0.040″–0.250″ and a density of 2 to 8 pounds per cubic foot.

4. The automotive liner panel defined in claim 2, wherein said intermediate layer has a thickness of 0.040″–0.750″ and a density of 1 to 8 pounds per cubic foot.

5. The automotive liner panel defined in claim 2, wherein said substrate layer has a thickness of 0.150″–0.180″ and a density of 4 pounds per square foot, and said intermediate layer has a thickness of 0.060″–0.500″ and a density of 1 to 4 pounds per cubic foot.

6. The automotive liner panel defined in claim 5, wherein said cover layer is cloth of a tricot type construction which has been knitted, dyed, and then napped for finished appearance.

7. The automotive liner panel defined in claim 5, wherein said cover layer is a vinyl skin having a thickness of 0.005″–0.010″.

8. A laminated, self-supporting, automotive liner panel of predetermined contour consisting of an outer substrate layer of a heat resistant, expanded styrene copolymer formed by the copolymerization of styrene and maleic anhydride which is relatively rigid and has a substantial resistance to bending, an intermediate layer of relatively soft, compressible, flexible urethane foam bonded to one side of said substrate layer by means of an intervening layer of adhesive, said intermediate layer being of sufficient thickness to provide heat and sound insulation, to provide a soft feel and to conceal imperfections in said substrate layer, and an outer flexible decorative finish cover layer bonded to the side of said intermediate layer opposite said substrate layer in direct surface-to-surface contact therewith.

9. The automotive liner panel defined in claim 8, wherein said adhesive is a water soluble synthetic resinous adhesive.

* * * * *